(12) United States Patent
Kim et al.

(10) Patent No.: US 9,682,827 B2
(45) Date of Patent: Jun. 20, 2017

(54) CONVEYOR APPARATUS

(71) Applicant: SAMSUNG ELECTRONICS CO., LTD., Suwon-si (KR)

(72) Inventors: Min Kim, Gwacheon-si (KR); Tae-gon Kim, Suwon-si (KR); Hoon Kim, Gwangju-si (KR); Hyun-joon Park, Suwon-si (KR); Seung-yong Oh, Suwon-si (KR); Hyun-hee Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 14/927,673

(22) Filed: Oct. 30, 2015

(65) Prior Publication Data

US 2016/0152413 A1 Jun. 2, 2016

(30) Foreign Application Priority Data

Nov. 28, 2014 (KR) ........................ 10-2014-0168230

(51) Int. Cl.
*B65G 21/14* (2006.01)
*B65G 21/16* (2006.01)
*B65G 47/51* (2006.01)

(52) U.S. Cl.
CPC ............................... *B65G 47/5122* (2013.01)

(58) Field of Classification Search
CPC ................................. B65G 21/14; B65G 21/16
USPC ....................................... 198/678.1, 680, 812
See application file for complete search history.

(56) References Cited

U.S. PATENT DOCUMENTS

| 4,413,724 | A  | * | 11/1983 | Fellner | B65G 47/5122 |
|           |    |   |         |         | 198/594 |
| 5,772,005 | A  | * | 6/1998 | Hansch | B65H 29/6645 |
|           |    |   |         |         | 198/594 |
| 6,585,109 | B1 | * | 7/2003 | Beyer | B65G 19/025 |
|           |    |   |         |         | 198/812 |
| 6,725,997 | B2 | * | 4/2004 | Draghetti | A24C 5/35 |
|           |    |   |         |         | 198/347.1 |
| 6,793,062 | B2 | * | 9/2004 | Hammock | A24C 5/35 |
|           |    |   |         |         | 198/347.1 |
| 6,896,120 | B2 | * | 5/2005 | Barry | B25J 18/04 |
|           |    |   |         |         | 198/367 |
| 7,219,788 | B2 | * | 5/2007 | Tuck | B65G 47/5122 |
|           |    |   |         |         | 198/347.2 |
| 7,299,832 | B2 | * | 11/2007 | Hartness | B65G 17/323 |
|           |    |   |         |         | 141/144 |
| 7,810,629 | B2 | * | 10/2010 | Kronseder | B65G 17/385 |
|           |    |   |         |         | 198/347.1 |
| 8,342,315 | B2 | * | 1/2013 | Fuellemann | B65B 35/18 |
|           |    |   |         |         | 198/347.1 |
| 8,528,719 | B2 | * | 9/2013 | Huttner | B65G 47/5131 |
|           |    |   |         |         | 198/347.1 |
| 8,590,689 | B2 | * | 11/2013 | Wahl | B65G 23/18 |
|           |    |   |         |         | 198/347.1 |

(Continued)

*Primary Examiner* — Douglas Hess
(74) *Attorney, Agent, or Firm* — Staas & Halsey LLP

(57) ABSTRACT

A conveyor apparatus is provided. The conveyor apparatus includes a rail formed in a closed curve line, a chain conveyor that moves along the rail, a driver that drives the chain conveyor, and a first and a second variable conveyors that relatively vary lengths of at least two portions of the chain conveyor so that a section of the chain conveyor remains in position while other portions of the chain conveyor moving along the rail.

20 Claims, 9 Drawing Sheets

(56) References Cited

U.S. PATENT DOCUMENTS

| | | | |
|---|---|---|---|
| 9,090,406 B2* | 7/2015 | Lopez | B65G 21/22 |
| 9,428,361 B2* | 8/2016 | Steiner | B65G 21/14 |
| 9,434,549 B2* | 9/2016 | Balk | B65G 21/14 |

* cited by examiner

CONVEYOR APPARATUS

CROSS-REFERENCE TO RELATED APPLICATIONS

This application is related to, and claims priority benefit to Korean Patent Application No. 10-2014-0168230, filed on Nov. 28, 2014 in the Korean Intellectual Property Office, the disclosure of which is incorporated herein by reference.

BACKGROUND

1. Field

Embodiments of the present invention relate to a conveyor apparatus, and more specifically, to a conveyor apparatus configured to maximize an efficiency in process management and space utilization by controlling chain conveyors to stay in their positions, or accelerate, for a desired process or place of operation.

2. Description of the Related Art

Electronic devices such as mobile phones are produced through complicated and various processes, and an automatic conveyor apparatus is used to move articles between the processes. Specifically, an automatic painting system according to the chain conveyor method is widely used in the operation of painting small electronic products such as casings of the mobile phones.

In the painting process with the related chain conveyor, a painting apparatus may move along the chain conveyor at an identical speed to that of the chain conveyor, and spray a paint on the articles attached to the chain conveyor. Therefore, the painting process may not be accurately performed, and there is a need for space sufficient for the moving of the painting apparatus.

Further, when certain plated articles need additional work, it is necessary to pause the whole process in order to perform the additional work for those articles. Thereby, additional defects occur in the other process, and the process is delayed.

In order to solve the shortcoming of having to stop the whole process, related technologies suggested use of additional driving apparatus to detach or attach the fixture on the main conveyor, or build the pallet system to add the stopper device on the desired position.

However, this means that a large area of the facility is required to operate the driving apparatus. Thus, the size of the associated facility increases, causing reduced space for the other processes.

Further, when the whole conveyor system stops due to power failure or the like, articles already partially entered into a painting room are partially painted, resulting in defects.

SUMMARY

Additional aspects and/or advantages will be set forth in part in the description which follows and, in part, will be apparent from the description, or may be learned by practice of the invention.

Exemplary embodiments of the present inventive concept may overcome the above disadvantages and other disadvantages not described above.

According to an embodiment, a technical objective is to provide a conveyor apparatus which has at least a pair of the variable conveyors at a predetermined operation section of the chain conveyor, and keeps a chain conveyor in position or accelerates the chain conveyor in a painting room located between the pair of variable conveyors, while continuously driving the chain conveyor and without stopping or accelerating the chain conveyor at a main driver.

According to an embodiment, a conveyor apparatus may include a rail configured in a closed curve line, a chain conveyor configured to move along the rail, a driver configured to drive the chain conveyor to move along the rail, and a first variable conveyor and a second variable conveyor, the first and the second variable conveyors configured to relatively vary lengths of at least two portions of the chain conveyor so that a section of the chain conveyor remains in position while the other portions of the chain conveyor are moving along the rail. The section of the chain conveyor that remains in position, while the other sections of the chain conveyor are moving, may be a predetermined section of the chain conveyor and may remain in position for a preset time.

The first and the second variable conveyors may each include a first fixed rail and a second fixed rail, the first fixed and the second fixed rails partially configuring the rail and being arranged horizontally to each other, and a moving rail configured in a circular arc shape, and facing, at each end of the moving rail, one end of the first and the second fixed rails, respectively.

The moving rail may reciprocate between the one end of each of the first and the second fixed rails and a preset distance.

The moving rail of the first variable conveyor and the moving rail of the second variable conveyor may simultaneously move with an identical speed toward opposite directions to each other.

First and the second portions of the chain conveyor respectively positioned on the first and the second variable conveyors may be varied in length to opposite directions to each other.

The moving rail of the first variable conveyor may move by a first distance toward a first direction away from the first and the second fixed rails of the first variable conveyor, and the moving rail of the second variable conveyor may move by the first distance toward a second direction near to the first and the second fixed rails of the second variable conveyor.

The chain conveyor may have a plurality of nodes arranged at regular intervals, and the moving rail may move with half of a speed of the speed of the chain conveyor.

The nodes positioned on the end of the first fixed rail of the first variable conveyor may move by a second distance that is twice the first distance, while the moving rail of the first variable conveyor moves by the first distance toward the first direction, to be arranged at first distance intervals with the end of the second fixed rail of the first variable conveyor.

The nodes positioned on the end of the second fixed rail of the first variable conveyor remain in position, while the moving rail of the first variable conveyor may move by the first distance toward the first direction.

The nodes positioned on the end of the first fixed rail of the second variable conveyor remain in position, while the moving rail of the second variable conveyor may move by the first distance toward the second direction.

The nodes positioned on the end of the moving rail of the second variable conveyor, which is spaced by a first distance from the end of the first fixed rail of the second variable conveyor, may move by a second distance that is twice the first distance, while the moving rail of the second variable conveyor moves the first distance toward the second direction, to be positioned on the end of the second fixed rail of the second variable conveyor.

A predetermined section of the chain conveyor may remain in position while another section of the chain conveyor may move a speed that is with twice a regular moving speed of the chain conveyor, while the moving rail of the second variable conveyor moves toward a first direction away from the first and the second fixed rails and while the moving rail of the second variable conveyor moves toward a second direction near to the first and second fixed rails.

A predetermined section of the chain conveyor may remain in position while another section of the chain conveyor may move by a distance that is four times the first distance, while the moving rail of the first and the second variable conveyors moves by the first distance.

The first and the second fixed rails and the moving rail of the first and the second variable conveyors may be provided with a hollow portion through which the chain conveyor passes.

The first and the second variable conveyors may be arranged at a height identical to that of the rail.

The first and the second variable conveyors may each additionally include a moving rail driver configured to drive the moving rail.

A time to keep a portion of the chain conveyor remaining in position may be adjusted according to a moving speed of the chain conveyor.

A time to keep a portion of the chain conveyor remaining in position may be adjusted according to a moving distance or a moving speed of the moving rail of the first and the second variable conveyors.

A painting room may be arranged on a predetermined section of the chain conveyor remaining in position.

In an embodiment, a conveyor apparatus may be provided, which may include a rail configured in a closed curve line, a chain conveyor configured to move along the rail, a driver configured to drive the chain conveyor to move along the rail, and a first and a second variable conveyors configured to relatively vary lengths of a plurality of portions of the chain conveyor so that a section of the chain conveyor remains in position or accelerates while the chain conveyor is moving. There may be at least two pairs of the first and the second variable conveyors provided. The section of the chain conveyor that remains in position, while the other sections of the chain conveyor are moving, may be a predetermined section of the chain conveyor and may remain in position for a preset time.

BRIEF DESCRIPTION OF THE DRAWINGS

The above and/or other aspects of the present inventive concept will be more apparent by describing certain exemplary embodiments of the present inventive concept with reference to the accompanying drawings, in which.

DETAILED DESCRIPTION

Figure 1:
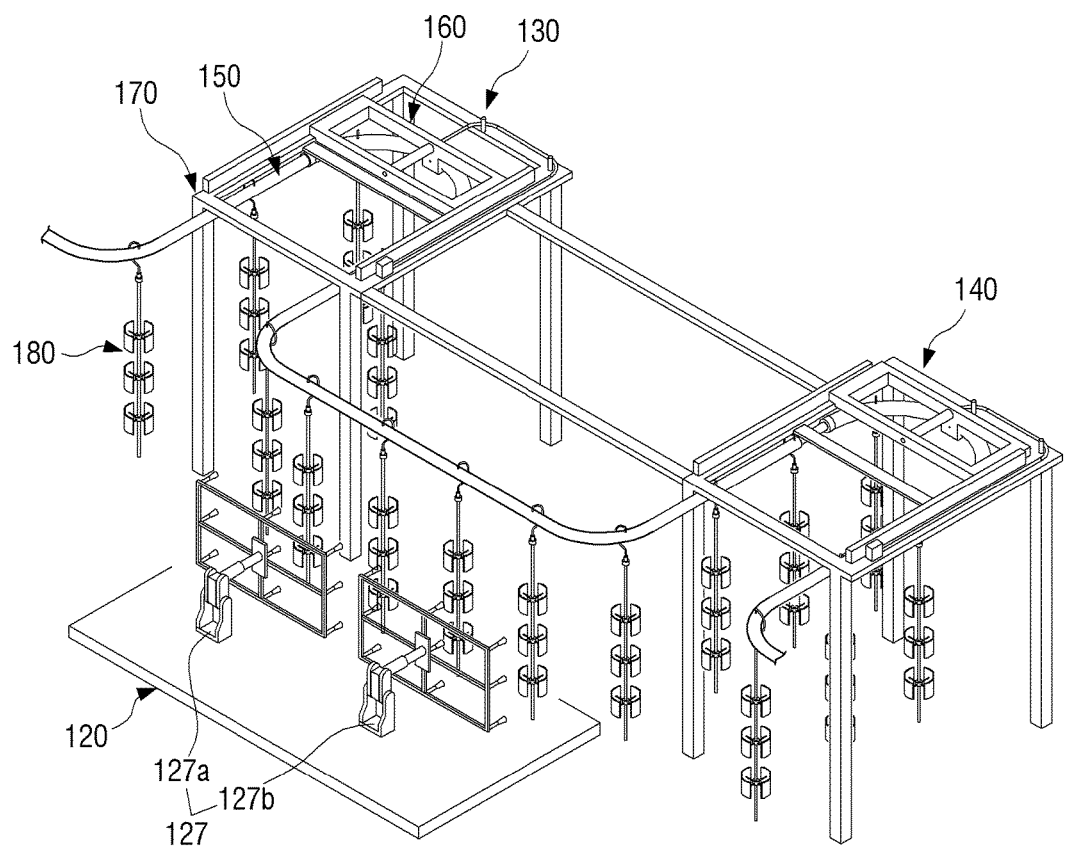
FIG. 1 illustrates a conveyor apparatus according to a first embodiment.

Exemplary embodiments of the present inventive concept are described in greater detail with reference to the accompanying drawings.

In the following description, same drawing reference numerals are used for the same elements even in different drawings. The matters defined in the description, such as detailed construction and elements, are provided to assist in a comprehensive understanding of the present inventive concept. Accordingly, it is apparent that the exemplary embodiments of the present inventive concept may be carried out without those specifically defined matters.

The configuration and operation of a conveyor apparatus 100 according to a first embodiment is disclosed by referring to FIGS. 1 to 5.

Figure 2:
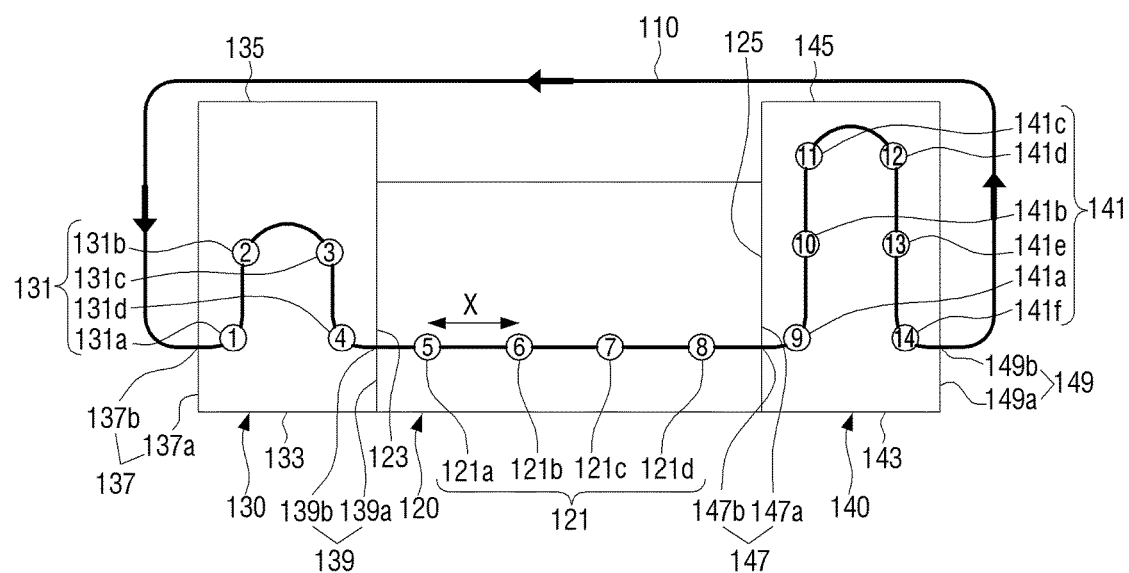
FIG. 2 is an exemplary top view of a conveyor apparatus according to a first embodiment.
Figure 4:
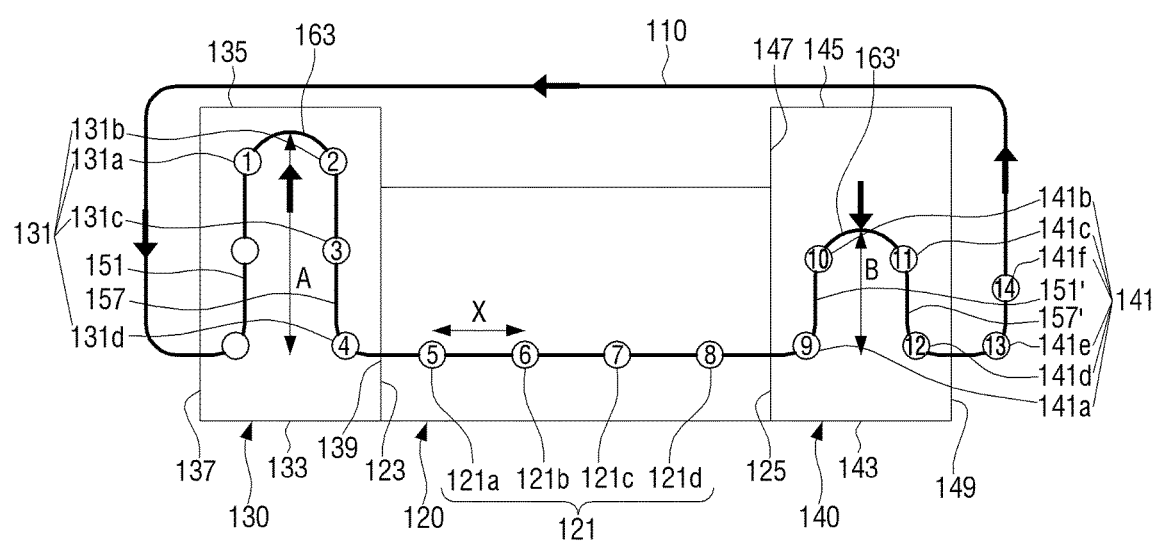
Figure 5:
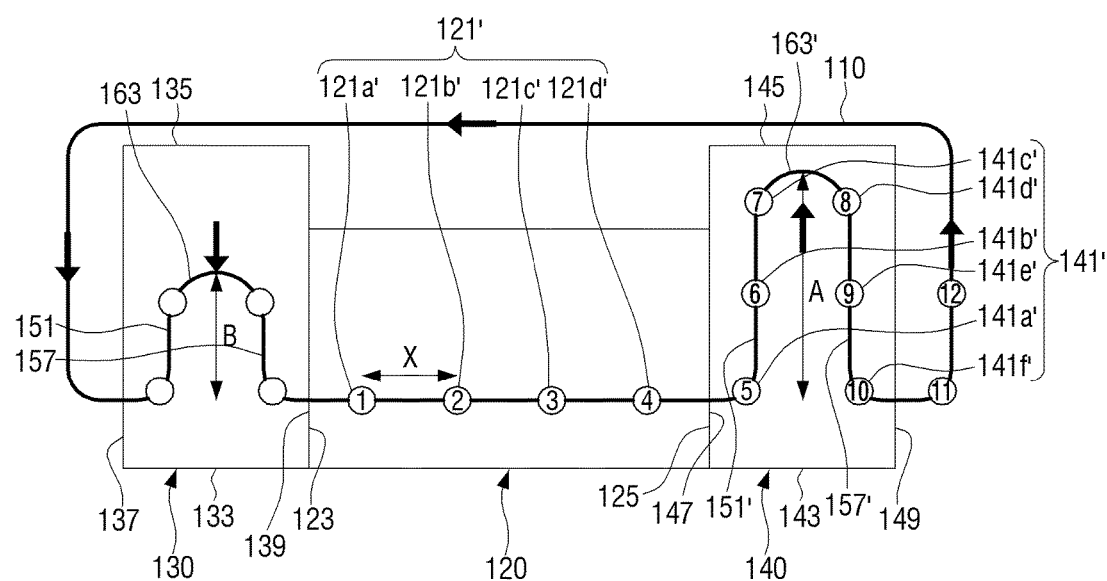

Referring to FIGS. 1, 2, and 5, the conveyor apparatus 100 includes a chain conveyor 110, a room e.g., a painting room 120, a first variable conveyor 130, a second variable conveyor 140, a fixed rail 150, a moving rail 160, and a frame 170. Although not illustrated in FIGS. 1 to 5, the chain conveyor 110 may be driven by a driver. Encircled numbers ①-⑭ illustrated in FIGS. 2-5 on the chain conveyor 110 indicate exemplary positions of respective nodes as discussed below.

A length of the chain conveyor 110 may be fixed and not extended with a tensile force or contracted with a compressive force throughout the process. As a length of the chain conveyor 110 of the first variable conveyor 130 increases, the length of the chain conveyor 110 of the second variable conveyor 140 decreases, for example, by a same amount. As a length of the chain conveyor 110 of the first variable conveyor 130 decreases, a length of the chain conveyor 110 of the second variable conveyor 140 increases, for example, by a same amount. The moving rails 163, 163' of the first and the second variable conveyor 130, 140 may move simultaneously, and respectively move toward the opposite directions to each other.

A roller (not illustrated) may be attached to the chain conveyer 110 so as to move along an interior of the fixed rail 150 and the moving rail 160 that may be provided in a pipe configuration having a hollow portion (not illustrated) therein. The chain conveyor 110 may continuously move at an identical speed throughout the process.

The chain conveyor 110 may be, for example, one of a variety of types of chain conveyors.

According to an exemplary embodiment, a process other than painting may be performed, e.g., a plating. However, a painting process is described as an example of such a process. Referring to FIG. 2, the painting room 120 may be a space in which a target process is performed, and may be formed on an operation section at which the chain conveyor 110 remains in position. The painting room 120 may include a node 121, a first inlet plane 123, a first outlet plane 125, and a painting portion 127.

Figure 3:
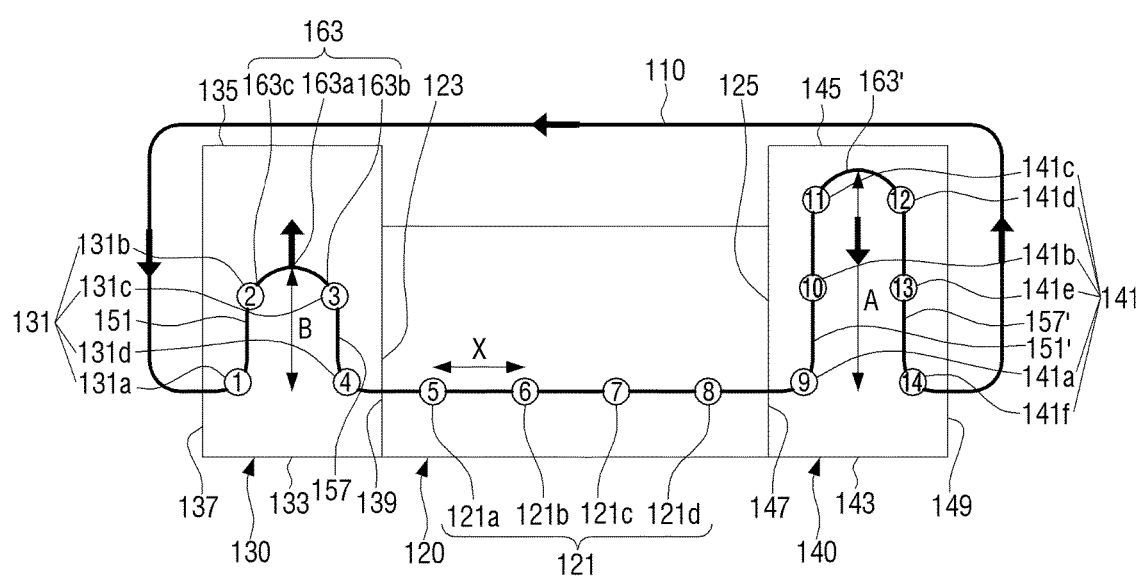
FIGS. 3 to 5 illustrate in an exemplary sequence, a driving state of a chain conveyor of a conveyor apparatus according to the first embodiment.

The node 121 is an exemplary portion at which one end of a painted article mount 180 may be mounted. An interval between the nodes 121a, 121b, 121c, 121d is illustrated in FIG. 3, for example, by a distance X. Although the four nodes are illustrated in the painting room 120, four or more nodes may be arranged in the painting room 120.

The first inlet plane 123 may be adjacent to the second outlet plane 139a. The first inlet plane 123 may be the plane at which the chain conveyor 110 exited from a second outlet plane 139a and entering into the painting room 120.

The first outlet plane 125 may be where the chain conveyor 110 completes a task and the painting room 130 is exited. The first outlet plane 125 may be arranged in proximity to the third inlet plane 147a.

The painting portion 127 may be a device that performs spraying with respect to the plated articles as a portion of the chain conveyor 110 remains in position or moves. For example, an exemplary embodiment may have two painting portions.

The painting room 120 may be configured between the first variable conveyor 130 and the second variable conveyor 140. The painting room 120 may be a working area in which paints are applied to a product article by spraying with a spray gun of the painting portion 127, but embodiments are not limited thereto. For example, the room 120 may serve as a working area for loading products.

When an operation of the process is not for painting, the chain conveyor 110 may move at an identical speed as that of the chain conveyor 110 as in the other processes in the painting room 120. However, for a painting operation, a portion of the chain conveyor 110 in the painting room 120 may remain in position, for example, the painting operation may be performed while the portion of the chain conveyor 110 remains in position for a certain amount of time, e.g., about two minutes. When an operation is accelerating, the portion of the chain conveyor 110 in the painting room 120 may move with a faster speed, e.g., twice the speed of the chain conveyor 110 for the other processes.

The first variable conveyor 130 may be positioned on one side of the painting room 120, and include a node 131, a first plane 133, a second plane 135, a second inlet portion 137, and a second outlet portion 139. The first variable conveyor 130 may accommodate the fixed rail 150, the moving rail 160, and the frame 170. The first variable conveyor 130 may be formed at an identical height to that of the rail.

The node 131 is an exemplary portion to which the painted substrate may be mounted. The interval between the nodes 131a, 131b, 131c, 131d may be represented by a distance X.

The first plane 133 may be formed, for example, at right angles with the second inlet plane 137a and the second outlet plane 139a, and may be, for example, adjacent to a second entering end 137b and a second exiting end 139b at which the chain conveyor 110 may be entering or exiting from the first variable conveyor 130. The second plane 135 may face the first plane 133.

A first direction may be defined as a direction from the first plane 133 to the second plane 135. A second direction may be defined as a direction from the second plane 135 to the first plane 133. The first direction may be defined to be a direction in which the moving rail 163 of the first variable conveyor 130 moves away from the first and the second fixed rails 151, 157 of the first variable conveyor 130, and the second direction may be defined to be a direction in which the moving rail 163' of the second variable conveyor 140 moves near to the first and the second fixed rails 151', 157' of the second variable conveyor 140.

The second inlet portion 137 may be defined as where the consecutively-moving chain conveyor 110 enters into the first variable conveyor 130. The second inlet portion 137 may include the second inlet plane 137a and the second entering end 137b.

The second outlet portion 139 may be positioned to face the second inlet portion 137. The chain conveyor 110 of the first variable conveyor 130 may enter into the painting room 120 through the second outlet portion 139.

The second variable conveyor 140 may have a similar configuration to the first variable conveyor 130, except for the different names of the components. The second variable conveyor 140 may include a node 141, a third plane 143, a fourth plane 145, a third inlet portion 147, and a third outlet portion 149. The second variable conveyor 140 may be formed in an identical height to that of the rail.

The node 141 is an exemplary portion where the substrate for plating may be mounted and may include nodes 141a, 141b, 141c, 141d, 141e, 141f.

The third plane 143 may form right angles with the third inlet portion 147 and the third outlet portion 149, and may be adjacent to the sections entered into and withdrawn from the second variable conveyor 140. The fourth plane 145 may face the first plane 143.

The first direction is a direction from the third plane 143 to the fourth plane 145. The second direction is a direction from the fourth plane 145 to the third plane 143.

The third inlet portion 147 may be adjacent to the first outlet plane 125, and may be a section in which the chain conveyor 110 passing through the painting room 120 enters the second variable conveyor 140. The third inlet portion 147 may include the third inlet plane 147a and the third entering end 147b.

The third outlet portion 149 may be configured at right angles with the third plane 143 and the fourth plane 145, and may be a section in which the chain conveyor 110 within the second variable conveyor 140 may be withdrawn externally. The third outlet portion 149 may include the third outlet plane 149a and the third exiting end 149b.

The operation of the conveyor apparatus 100 according to an embodiment is specifically described by referring to FIGS. 3 to 5.

FIG. 3 illustrates an exemplary starting state in which a portion of the chain conveyor 110 remains in position, for example, for a preset time in the painting room 120, and FIG. 4 illustrates an exemplary closing state in which a portion of the chain conveyor 110 remains in position, for example, for a preset time in the painting room 120.

Referring to FIG. 3, the chain conveyor 110 may enter into the first variable conveyor 130 through the second entering end 137b, for example, after separate processes at the other operation sections are completed. The chain conveyor 110 entered perpendicularly to the second inlet plane 137a through the second entering end 137b may move, for example, along the curve line in a circular arc shape in order to enter into the first fixed rail 151 formed toward the first direction. The circular arc shape indicates that the moving shape may be formed to be curved shape toward the first direction as the conveyor passing through the second entering end 137b moves toward the first variable conveyor 130.

The chain conveyor 110 passing through the other end of the second fixed rail 157 may move along the curve line in the circular arc shape to enter into the painting room 120, and the chain conveyor 110 withdrawn from the painting room 120 may move along the curve line in a circular arc shape to enter into the first fixed rail 151' of the second variable conveyor 140. The chain conveyor 110 withdrawn from the second fixed rail 157' of the second variable conveyor 140 may move along a curve line in the circular arc shape, for example, to be withdrawn from the second variable conveyor 140 externally.

When a portion of the chain conveyor 110 does not need to remain in position for a preset time in the painting room 120 or for a general operation that does not need the accelerating movement of the chain conveyor 110, the fixed rail 163 may not move, and the chain conveyor 110 may move toward the painting room 120 through the first fixed rail 151, the moving rail 163 and the second fixed rail 157. In this case, the chain conveyor 110 may move a distance X, e.g., a first distance for a preset time with a preset speed in the painting room 120.

The variable conveyors 130, 140 may be varied from the state of FIG. 3 to the state of FIG. 4 in order to implement the state in which a portion of the chain conveyor 110 positioned on the painting room 120 remains in position.

Thus, referring to FIG. 3, the moving rail 163 of the first variable conveyor 130 may move toward the first direction with a speed having half of a rate of the moving speed of the chain conveyor 110, and the moving rail 163' of the second variable conveyor 140 may move toward the second direction with a speed having half of a rate of the moving speed of the chain conveyor 110. When the moving rail 163 of the first variable conveyor 130 moves toward the first direction, the perpendicular line to a virtual line connecting the second entering end 137b and the second exiting end 139b may be extended toward the first direction, and the length meeting the uppermost end 163a of the arc toward the first direction may be a distance B on the moving rail 163. The length of the line perpendicular to a virtual line connecting the third entering end 147b and the third exiting end 149b may be a distance A on the uppermost end 163a' toward the first direction of the arc of the moving rail 163' of the second variable conveyor 140.

Referring to FIG. 4, the moving rail 163 of the first variable conveyor 130 may complete moving toward the first direction simultaneously when the moving rail 163' of the second variable conveyor 140 completes moving toward the second direction.

A perpendicular line to a virtual line connecting the second entering end 137b and the second exiting end 139b of the first variable conveyor 140 may be extended toward the first direction, and the length of the line meeting the uppermost end 163a of the arc toward the first direction may be a distance A on the moving rail 163. Thus, the moving rail 163 may move toward the first direction by a difference between a distance A and a distance B corresponding to a distance X.

The length of the line perpendicular to a virtual line connecting the third entering end 147b and the third exiting end 149b on the uppermost end 163a' of the arc toward the first direction may be a distance B of the moving rail 163' of the second variable conveyor 140. In this case, the moving rail 163' of the second variable conveyor 140 may move toward the second direction by a distance X.

Referring to FIG. 3, an exemplary in position configuration may be kept from the position ③ of node 131c to the position ⑩ of node 141b from the time when the moving rail 163 of the first variable conveyor 140 moves toward the first direction and the moving rail 163' of the second variable conveyor 140 moves toward the second direction. The in position configuration may be kept by each node (the nodes at positions ③ to ⑩ may be continued until the time when the moving rail 163 of the first variable conveyor 130 completes moving toward the first direction and the moving rail 163' of the second variable conveyor 140 completes moving toward the second direction in FIG. 4.

The position ② of node 131b of FIG. 3 may be positioned on the end toward the first direction on the first fixed rail 151 of the first variable conveyor 130. The position ② of node 131b of the first variable conveyor 130 may be positioned on the moving rail exiting end 163b adjacent to the second outlet portion 139 in FIG. 4. Further, while the moving rail 163 of the first variable conveyor 130 moves toward the first direction with a speed having half of a rate of the moving speed of the chain conveyor 110, the position ① of node 131a of FIG. 3 entered into the second inlet portion 137 may continuously move with the identical moving speed to that of the chain conveyor 110. Thereby, when the moving rail 163 of the first variable conveyor 130 completes moving in FIG. 4, the position ① of node 131a may move to the moving rail entering end 163c adjacent to the second inlet portion 137 of the moving rail 163 of the first variable conveyor 140.

The position ③ of node 131c of the first variable conveyor 130 may remain in position from the time when the moving rail 163 moves toward the first direction with the speed having half of the rate of the moving speed of the chain conveyor 110 in FIG. 3. When the moving rail 163 of the first variable conveyor 130 moves, the chain conveyor 110 at the moving rail exiting end 163b adjacent to the second outlet portion 139 of the moving rail 163 appears to remain in position as the moving rail 163 of the first variable conveyor 130 moves toward the first direction.

As a result, position ③ of node 131c appears to remain in position relatively while position ② of node 131b moves by a distance of 2X e.g., a second distance, and the section between position ③ of node 131c and position ② of node 131b appears to remain in position at the moving rail exiting end 163b in FIGS. 3 and 4. Thereby, the section between the position ③ of node 131c to position ⑩ of node 141b may remain in position while the moving rail 163 of the first variable conveyor 130 moves by a first distance X, and the painting may be performed in the painting room 120.

For the chain conveyor 110 to consecutively move at a uniform speed while performing the painting for a certain time in the painting room 120, the moving rail 163' of the second variable conveyor 140 may move toward the second direction, while the moving rail 163 of the first variable conveyor 130 may move toward the first direction, and while the first variable conveyor 130 is entered by a portion of the chain conveyor 110 where the nodes positioned previous to the position ③ of node 131c are positioned. Thus, as much of the chain conveyor 110 entering the first variable conveyor 130 may be withdrawn from the second variable conveyor 140 externally.

A moving speed of the chain conveyor 110 may be varied in order to adjust the time to keep a portion of the chain conveyor 110 in position. The time to keep a portion of the chain conveyor 110 in position may be adjusted by varying a moving distance or a moving speed of the moving rails 163, 163' of the first and the second variable conveyors 130, 140.

The operation and the configuration of the second variable conveyor 140 may be similar to the first variable conveyor 130, however, according to an embodiment one of the different configurations is to exit the chain conveyor 110 when the moving direction of the moving rail 163' of the second variable conveyor 140 is opposite to the moving direction of the moving rail 163 of the first variable conveyor 130. Thus, the similar configurations to the first variable conveyor 130 are not be described below, and the following is explained based on an exemplary different configuration from the first variable conveyor 130.

The locations of position ③ of node 131c to the position ⑩ of node 141b may remain in position as the moving rail 163 of the first variable conveyor 130 moves toward the first direction. The position ⑪ of node 141c may move along the moving rail 163' at the time when the moving rail 163' of the second variable conveyor 140 moves toward the second direction. The actual speed of the position ⑪ of node 141c may be slow, however, because the moving rail 163' moves toward the second direction, the identical effects in moving by twice the distance 2X may be obtained when the moving rail 163' of the second variable conveyor 140 completes moving as illustrated in FIG. 4. The nodes 141e, 141d and the others at positions more than position ⑫ of node 141d may be positioned on the exterior of the moving rail 163' of the second variable conveyor 140. Thus, the nodes 141e, 141d and the others at positions more than position ⑫ of node 141d may move by twice the distance 2X, while the moving rail 163' of the second variable conveyor 140 moves by a distance X.

Therefore, the chain conveyor 110 other than the painting room 120 and the variable conveyors 130, 140 may continuously move simultaneously, while a portion of the chain conveyor 110 in the painting room 120 may remain in position for a preset time.

According to the configuration of the variable conveyors 130, 140, the chain conveyor 110 may be kept in position for a certain time in the painting room 120, which can perform the process such as painting more precisely.

According to an embodiment of the present invention, to request larger working area because the working should be performed by moving along the conveyor, an exemplary embodiment may perform the working at the situation in which a portion of the chain conveyor 110 remains in position for a preset time. Thus, the size of the painting room 120 can be creatively reduced, and the system can be further simplified by reducing the cost for the utilities and the accessory facilities provided to the painting room 120.

The target process can be performed, e.g., completely performed within the painting room 120, while a portion of the chain conveyor 110 remains in position. Thus, a disorder in the external chain conveyor 110 or a power cut occurs, the working may complete in the painting room 120, which minimizes the defective rate of the products. Further, when the whole conveyor 110 pauses for a reason such as power cut, some plated articles entered into the painting room 120 may not be completely processed with the spray working. In this case, corresponding plated articles may be entered into the painting room 120 by moving the first and the second variable conveyor 130, 140 with a small amount of the electrical power. Therefore, the defects of the products can be removed.

Pallet systems may have a problem in which the time loss can be largely generated from the moving to the pausing as a number of the moving articles increases because the consecutive movement is requested. However, the embodiments of the present invention may perform the working for the pausing at some certain area in which the working load is large, and may not affect the other areas. Thus, the time loss is minimized.

FIGS. 4 and 5 illustrate implementing the accelerating state in the painting room 120. FIG. 4 illustrates an exemplary initial operation to implement the accelerating state in the painting room 120, and FIG. 5 illustrates an exemplary closing operation to complete the accelerating state in the painting room 120.

The configuration and the operation for the process indicating the accelerating state may be similar to the configuration and the operation to implement the state in which a portion of the chain conveyor 110 remains in position for a preset time. However, the directions of the moving rails 163, 163' may be different from the above regarding the initial operation and the closing operation to implement the accelerating state. Therefore, the configuration similar to that for the state in which a portion of the chain conveyor 110 remains in position for a preset time will not be described below.

In the state illustrated in FIG. 4, the moving rail 163 of the first variable conveyor 130 may move toward the second direction simultaneously when the moving rail 163' of the second variable conveyor 140 may move toward the first direction.

In the state illustrated in FIG. 5, the moving rail 163 of the first variable conveyor 130 may move by a distance A-B, i.e., distance X, for example, with a speed having a half rate of the moving speed of the chain conveyor 110. The moving rail 163' of the second variable conveyor 140 may also move by a distance X with the speed having the half rate of the moving speed of the chain conveyor 110.

When the speed of the external chain conveyor 110 is zero and when the moving rails 163, 163' respectively move by distance X, the nodes may move by twice a distance X. Thus, when the speed of the external chain conveyor 110 is regular and when the speed of the moving rails 163, 163' is half of the moving speed of the chain conveyor 110, the chain conveyor 110 continuously moving may further move by twice the distance X. Therefore, moving may be performed four times the distance X in total.

Thereby, the positions ⑤ to ⑧ of nodes 121a, 121b, 121c, 121d in which the working is completed in the painting room 120 may move by four distances X toward the second variable conveyor 140 while the moving rails 163, 163' move by one distance X, to form some of the nodes 141' of the second variable conveyor 140. Likewise, the positions ① to ④ of nodes 131a, 131b, 131c, 131d on the first variable conveyor 130 may move on the painting room 120 and may be replaced with the positions ⑤ to ⑧ of the nodes 121' for the subsequent operation.

As a result, the whole process may be efficiently performed in the whole system with an identical frequency as a the case in which the variable conveyors 130, 140 are not provided by further moving the nodes by distance that may not be moved during the state in which a portion of the chain conveyor 110 remains in position for a preset time.

Further, efficiency of using the painting room 120 can be enhanced because the treated painted articles of the chain conveyor 110 are withdrawn externally from the painting room 120 at once.

An interval between the nodes may be a distance X; however, the interval may be longer or shorter than the distance X. When the distance is shorter or longer than X, the chain conveyor 110 may be in the state of remaining in position or accelerating for a preset time in the painting room 120 by respectively moving the variable conveyors 130, 140.

Figure 6:
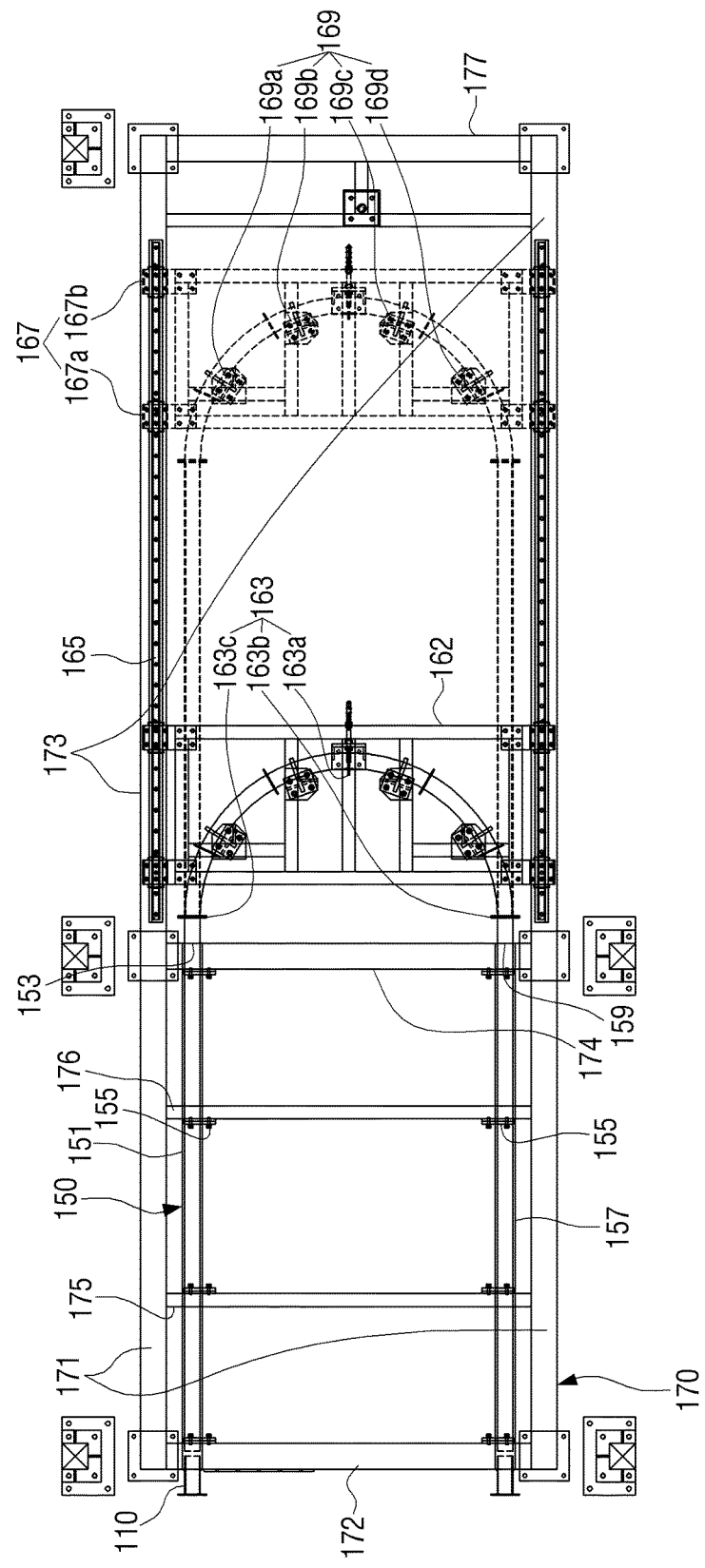
FIG. 6 is a top view of a variable conveyor of a conveyor apparatus according to an embodiment.
Figure 7:
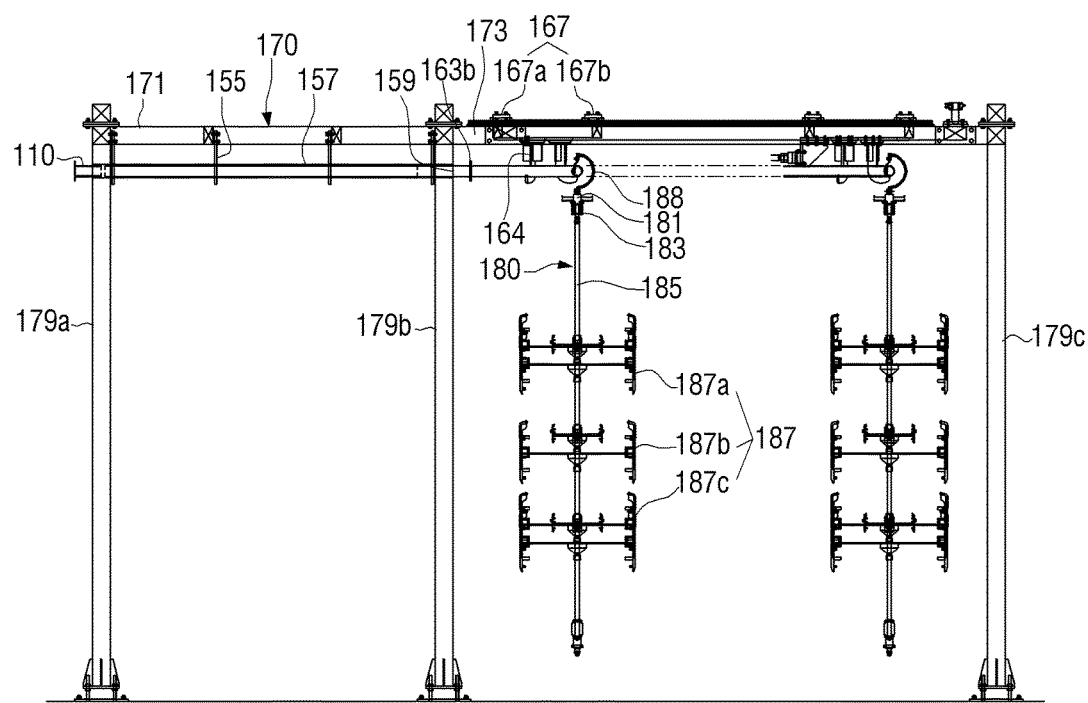
FIG. 7 is a front view of a variable conveyor of a conveyor apparatus according to an embodiment.
Figure 8:
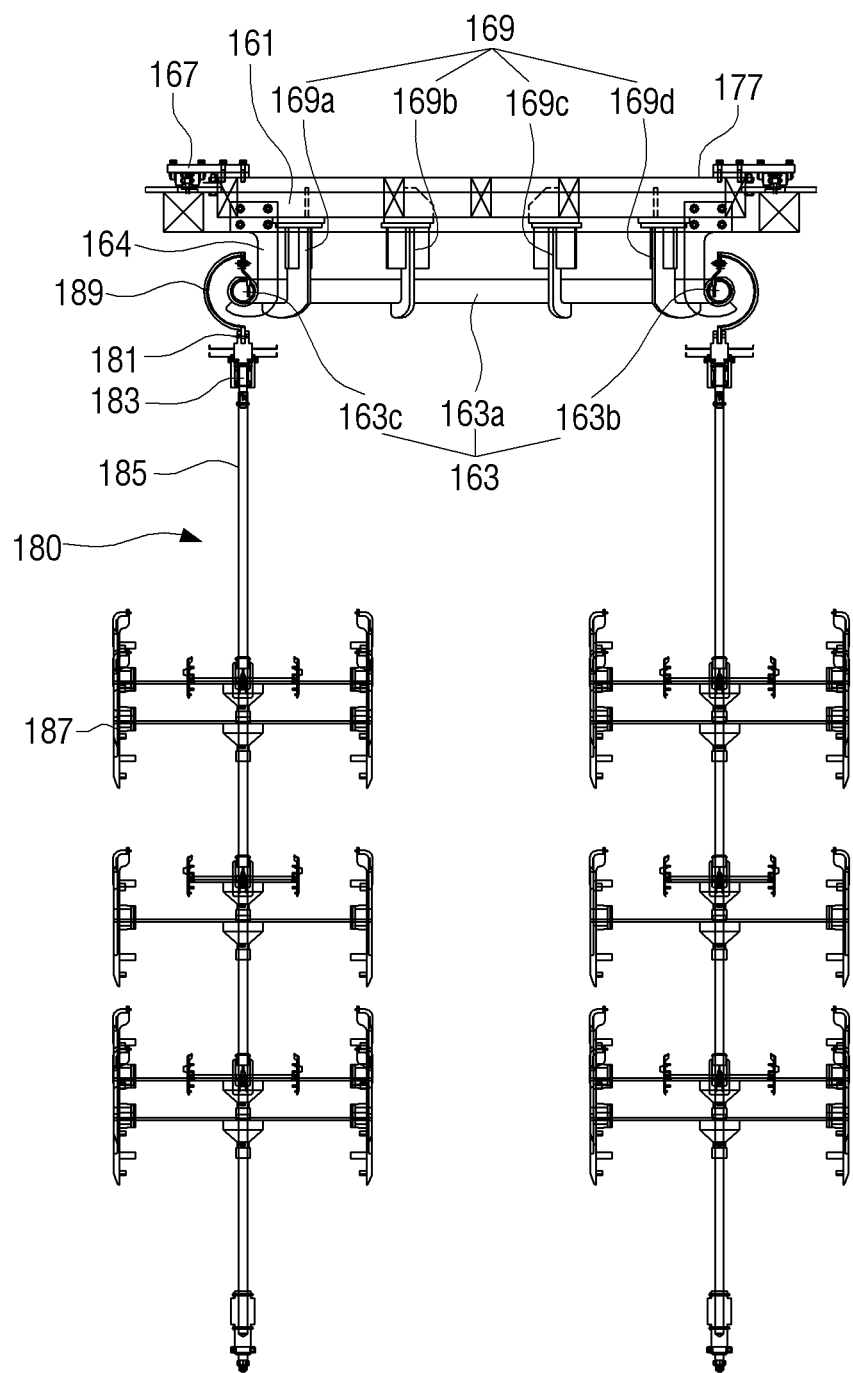
FIG. 8 is a cross-section view of a variable conveyor of a conveyor apparatus according to an embodiment.

Referring to FIGS. 6 to 8, the fixed rail 150, the moving rail 160, and the frame 170 are provided on the first variable conveyor 130 of the conveyor apparatus 100 according to an embodiment.

The configuration of the fixed rail 150', the moving rail 160' and the frame 170' on the second variable conveyor 140 are respectively similar to the configuration of the fixed rail 150, the moving rail 160, and the frame 170 on the first variable conveyor 130.

The fixed rail 150 is where the chain conveyor 110 enters so as to continuously move or remain in position. The fixed rail 150 includes the first fixed rail 151, the first fixed rail exiting gate 153, a fixed rail supporter 155, the second fixed rail 157 and the second fixed rail entering gate 159.

The first fixed rail 151 partially forms the rails, which may be provided to accommodate and guide the chain conveyor 110 entered into the first variable conveyor 130. The sectional plane may be circular shape, and the pipe shape may be formed toward the length. The chain conveyor 110 may be entered into the first fixed rail 151, and slide-moved along the first fixed rail 151.

The second fixed rail 157 partially forms the rails, which may be arranged horizontally with the first fixed rail 151 with width corresponding to both ends 163b, 163c of the moving rail 163.

The first fixed rail exiting gate 153 may be provided for the chain conveyor 110 passing through the first fixed rail 151 to enter into the moving rail 160. The sectional plane may be in circular shape.

When the painting process is not necessary in the painting room 120 or when the accelerated moving is not requested, the chain conveyor 110 withdrawn from the first fixed rail exiting gate 153, for example, may enter, for example, immediately enter into the moving rail 163, pass through the moving rail 163, and enter into the second fixed rail 157 through the second fixed rail entering gate 159.

However, at a time when a portion of the chain conveyor 110 starts to remain in position, for example, for a preset time in the painting room 120, the chain conveyor 110 withdrawn from the first fixed rail exiting gate 153 may immediately enter into the moving rail 163. However, the chain conveyor 110, immediately before the first fixed rail exiting gate 153, may move along the moving rail 163 as the moving rail 163 moves, and may be positioned within the moving rail 163 at the time when the moving rail 163 completes moving.

When the moving of the moving rail 163 is completed according to the relative movement of the chain conveyor 110 and the moving rail 163, the nodes before a distance of 2X from the first fixed rail exiting gate 153 may be positioned on the moving rail entering end 163c, and the nodes on the first fixed rail exiting gate 163 may be positioned on the moving rail exiting end 163b.

The chain conveyor 110 on the second fixed rail entering gate 159 may relatively remain in position according to the relative movement of the moving rail 163 and the chain conveyor 110. The portion of the chain conveyor 110 to remain in position between the moving rail exiting end 163b and the second fixed rail entering gate 159 may gradually increase as the moving rail 163 moves.

When a portion of the chain conveyor 110 in the painting room 120 is converted from the state of remaining in position for a preset time into the accelerating state, the chain conveyor 110 on the moving rail entering end 163c may enter into the second fixed rail 157 while passing through the moving rail 163. When the horizontal moving distance of the moving rail 163 is long, the nodes 121' may enter into the painting room 120.

The fixed rail supporter 155 may be provided to fix the fixed rail 150 on the frame 170. The fixed rail 150 may be formed at some sections of the upper portion of the frame 170, and the fixed rails 151, 157 may be fixed on the frame 170 with the fixed rail supporter 155 formed on both ends of the horizontal frame 175 of the frame 170. The upper portion of the fixed rail supporter 155 may be fixed on the horizontal frame 175, and the lower portion may be in a hook shape and may fix and support the fixed rails 151, 157.

The moving rail 160 may reciprocate from one end of the fixed rail 150 to distance, e.g., a preset distance while facing the fixed rail 150. The moving rail 160 may include the moving rail guide 161, the moving rail block 162, the moving rail 163, the conveyor supporter 164, the moving rail driver 165, 167 and the moving rail supporter 169.

According to an embodiment, the moving rail guide 161 is where the moving rail support 169 may be fixed. The moving rail guide 161 may be supported and moved together with the moving rail block 162. The moving rail guide 161 may be extended from one side end to the other side end of the moving rail block 162, and formed in a U shape or a circular arc shape corresponding to the shape of the moving rail 163. The circular arc is the shape in which the chain conveyor 110 entered into the moving rail entering gate 163c and may be withdrawn from the direction opposite to the direction entered into the moving rail 163 by modifying the moving direction from the first direction to the second direction simultaneously while modifying the direction from the extended portion of the first fixed rail 151 into the extended portion of the second fixed rail 157 as the chain conveyor 110 moves along the moving rail 163.

The moving rail drivers 165, 167 may move the moving rail 163 by the moving rail supporter 169 as the moving rail guide 161 attached to the moving rail block 162 moves together, when the moving rail block 162 moves, for example, according to the driving force by the interaction between a stator 165 and a translator 167.

The moving rail block 162 is where the moving rail 163 may reciprocate. The moving rail block 162 may be fixed by the translator 167 on the four sites, and include at least two lengthwise frames and at least two width-directed frames. The moving rail guide 161 may be fixed, for example, on the frames described above.

The moving rail 163 may be respectively faced with one end of each of the first and the second fixed rails 151, 157, and formed in a circular arc shape. The moving rail 163 may be configured in a hollow pipe shape in which the chain conveyor 110 passes through while return-moving on the first variable conveyor 130. The moving rail 163 may include the uppermost end 163a of the arc, the moving rail exiting end 163b, and the moving rail entering end 163c.

According to an embodiment, the uppermost end 163a of the arc is where the chain conveyor 110 may approach by the farthest distance toward the first direction. The moving direction of the chain conveyor 110 may be changed from the first direction to the second direction at the uppermost end 163a of the arc as the boundary.

The moving rail exiting end 163b is where the chain conveyor 110 passing through the moving rail 163 may be withdrawn. The moving rail exiting end 163b may be opposed to the second fixed rail entering gate 159. The sectional plane of the moving rail exiting end 163b may be formed to be circular shape. When implementing the state in which a portion of the chain conveyor 110 remains in position for a preset time in the painting room 120, the moving rail exiting end 163b may move toward the first direction, and the chain conveyor 110 between the moving rail exiting end 163b and the second fixed rail entering gate 159 may remain in position.

The moving rail entering end 163c is where the chain conveyor 110 passing through the fixed rail 150 may be withdrawn. The moving rail entering end 163c may be opposed to the first fixed rail entering gate 153. The sectional plane of the moving rail entering end 163c may be formed to be in a circular shape.

The conveyor supporter 164 may be arranged to be adjacent to both ends of the moving rail 163. The conveyor supporter 164 may perform the supporting or the guiding the chain conveyor 110 entering or exiting from the moving rail 163.

Referring to FIG. 7, the conveyor supporter 164 may be connected with the translator 167, and formed to be in a hook shape. The conveyor supporter 164 may support the chain conveyor 110 while moving together with the moving rail 163, which prevents the hanging down of the chain conveyor 110 due to the weight of the painted articles.

The moving rail drivers 165, 167 may include the stator 165 and the translator 167.

The stator 165 may include a permanent magnet in which the polarity is alternately arranged, and the guide (not illustrated) to guide the translator 167 may be arranged on both sides of the stator 165. The stator 165 may be formed to have two parts horizontally to the fixed rails 151, 157 respectively so as to correspond to the first and the second fixed rails 151, 157. The stator 165 may drive the moving rail block 162 according to the interaction with the translator 167, and perform the guiding so that the moving rail block 162 moves straightforwardly.

The translator 167 may be formed on the upper portion of the stator 165, and include three phases U, V, W. Each phase U, V, W may be wound with each coil (not illustrated). At least two translators 167 may be formed on the stator 165. The two translator 167 may be connected with the frame of the moving rail block 162 to simultaneously move together.

A cable (not illustrated) of the related linear motor that provides the electrical power and trans-receives signals, and a controller (not illustrated) that controls the linear motor, may be of various types.

As illustrated, the linear motors 165, 167 may be exemplified as a device to apply the driving force on the moving rail 163, however, the driving force may be delivered on the moving rail 163 by a cylinder.

The moving rail supporter 169 may be configured to be a hook shape, and may support the moving rail 169. The moving rail supporter 169 may include at least four supporters 169a, 169b, 169c, 169d. The upper portion of the moving rail supporter 169 may be fixed by the moving rail guide 161, and the lower in a hook shape may cover the moving rail 163. Thereby, when the moving rail block 162 moves, the moving rail supporter 169 may support the moving rail 163, and the moving rail guide 161 may push or pull the moving rail 163. Thus, the moving rail 163 may perform the return-moving.

The frame 170 may be configured to support the fixed rail 150 and the moving rail 160. The frame 170 may include the fixed rail frame 171, the moving rail frame 173, the horizontally-oriented frames 172, 174, 175, 176, 177 and the pillar frames 179a, 179b, 179c.

The fixed rail frame 171 may be configured to support the fixed rail 150, which may be positioned on the uppermost end of the frame 170. The fixed rail frame 171 may be arranged horizontally to each other on the upper portion of the fixed rails 151, 157 in order to support the first and the second fixed rails 151, 157.

The moving rail frame 173 may be configured to support the moving rail 160, which may be extended and formed from the fixed rail frame 171 at the identical height to that of the fixed rail frame 171. The stator 165 may be formed on the upper or one side of each moving rail frame 173. The moving rail frame 173 may be formed to support the dynamic load according to the moving of the moving rail 160.

The horizontally-oriented frames 172, 174, 175, 176, 177 may be provided to directly support the fixed rail 150, formed on the fixed rail 150 and the moving rail 160, and these 172, 174, 175, 176, 177 may include the first horizontally-oriented frame 172, the second horizontally-oriented frame 174, the third horizontally-oriented frame 175, the fourth horizontally-oriented frame 176 and the fifth horizontally-oriented frame 177.

On both sides of the first to the fourth horizontally-oriented frames 172, 174, 175, 176 positioned on the fixed rail 150, the fixed rail supporter 155 to respectively support the fixed rails 151, 157 may be formed. The upper portion of the fixed rail supporter 155 in a hook shape may be fixed to the first to the fourth horizontally-oriented frame 172, 174, 175, 176. The fifth horizontally-oriented frame 177 positioned on the moving rail 160 may be arranged to support the weight of the chain conveyor 110 loaded according to the moving of the moving rail 163. The first to the fifth horizontally-oriented frame 172, 174, 175, 176, 177 may be arranged horizontally to each other.

The pillar frames 179a, 179b, 179c may be provided to support the load of the chain conveyor 110 which is distributed on the fixed rail frame 171, the moving rail frame 173, and the horizontally-oriented frames 172, 174, 175, 176, 177. The pillar frames may be formed to be at least six parts per two pairs on the left and the right in order to support the frame 170.

Referring to FIGS. 7 and 8, the plated article mount 180 according to an embodiment is described.

The plated article mount 180 may be configured to install the electronic products such as mobile phone to be painted in the painting room 120. The plated article mount 180 may include a hinge 181, a spindle 183, a spindle pipe 185, a jig mount 187, and a hanger 189.

A hollow portion formed along the length direction of the rails 151, 157, 163 may be provided on the upper side of the fixed rails 151, 157 and the moving rail 163. The hanger 189 may be coupled with the chain conveyor 110 while passing through the hollow portion. The lower end of the hanger 189 may be connected to the spindle 183, the spindle pipe 185, and the jig mount 187 in series, and the hanger 189 and the spindle 183 may be connected with the hinge 181.

The jig mount 187 may be where the articles such as a mobile phone case may be united and transmitted to each process.

Various types of mounts may be used for the plated article mount 180.

Figure 9:
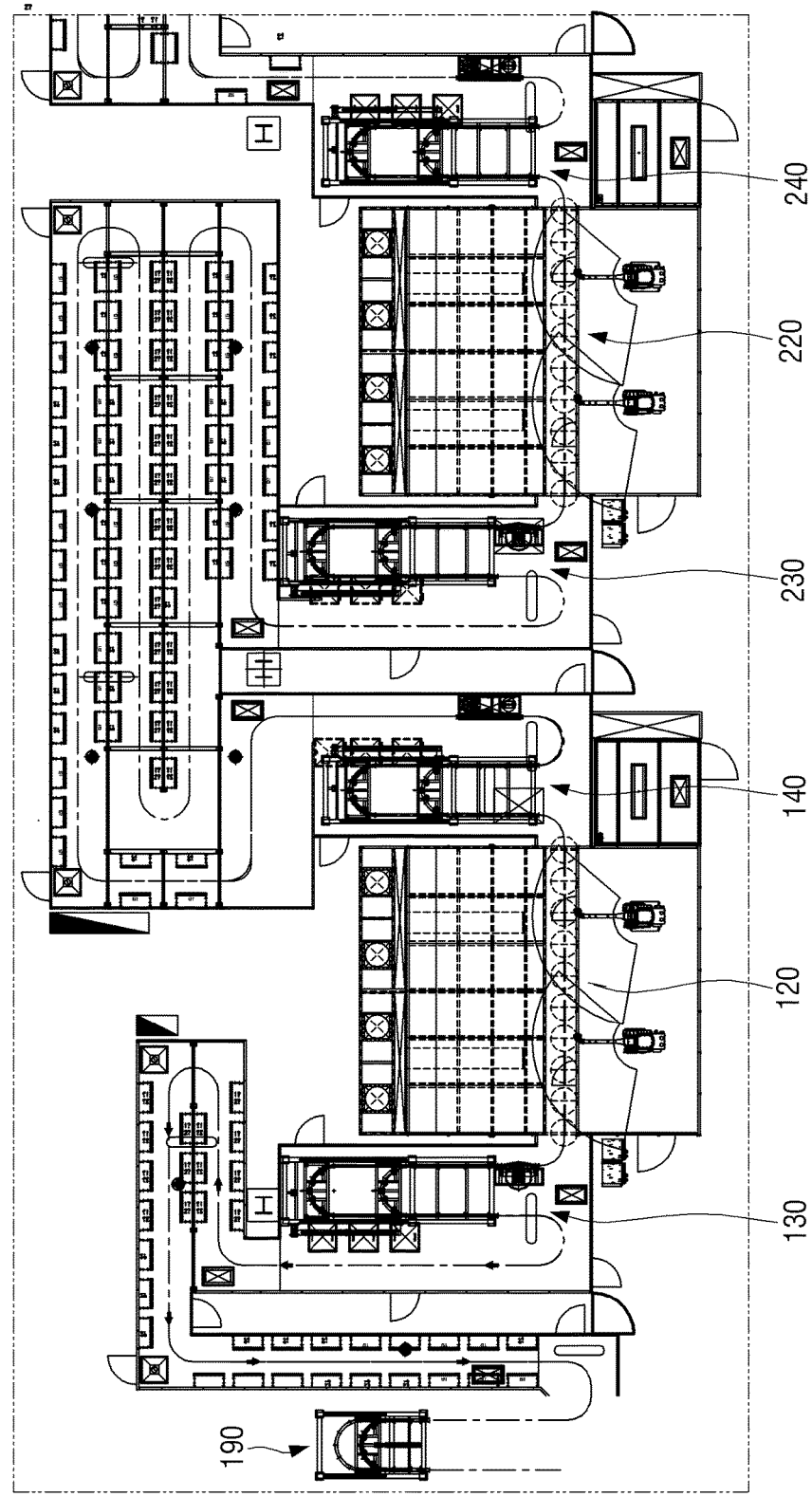
FIG. 9 is a schematic top view of a conveyor apparatus according to a second embodiment.

FIG. 9 is a diagram illustrating the conveyor apparatus 200 according to a second embodiment.

Referring to FIG. 9, the conveyor apparatus 200 includes two pairs of the variable conveyors 130, 140, 230, 240, the two painting rooms 120, 220 and the driver 190.

Further, although FIG. 9 exemplifies the variable conveyors as two pairs, three or more pairs of the variable conveyors may be provided according to the target process.

The driver 190 may drive the chain conveyor moving along the closed curve line of the rail. Although the embodiment exemplifies one driver 190, more than two drivers may be preferably provided if the number of the processes is great.

The foregoing exemplary embodiments and advantages are merely exemplary and are not to be construed as limiting the exemplary embodiments. The present teaching can be applied to other types of apparatuses. Also, the description of the exemplary embodiments of the present inventive concept is intended to be illustrative, and not to limit the scope of the claims.

Although a few embodiments have been illustrated and described, it would be appreciated by those skilled in the art that changes may be made in these embodiments without departing from the principles and spirit of the invention, the scope of which is defined in the claims and their equivalents.

What is claimed is:

1. A conveyor apparatus, comprising:
a rail configured in a closed curve line;
a chain conveyor configured to move along the rail;
a driver configured to drive the chain conveyor to move along the rail; and
a first variable conveyor at a first position and a second variable conveyor at a second position each including at least one fixed rail and a moving rail, the first and the second variable conveyors configured to relatively vary lengths of at least two portions of the chain conveyor with respect to the first position and the second position by a movement of at least one of the moving rail of the first variable conveyor and the second variable conveyor so that a section of the chain conveyor remains in position while other portions of the chain conveyor are moving along the rail.

2. The conveyor apparatus of claim 1, wherein
the at least one fixed rail being a first fixed rail and a second fixed rail, the first and the second fixed rails partially configuring the rail and being arranged horizontally to each other, and
the moving rail configured in a circular arc shape, and facing, at each end of the moving rail, one end of each of the first and the second fixed rails.

3. The conveyor apparatus of claim 2, wherein the moving rail reciprocates between the one end of each of the first and the second fixed rails and a preset distance.

4. The conveyor apparatus of claim 3, wherein the moving rail of the first variable conveyor and the moving rail of the second variable conveyor simultaneously move with an identical speed toward opposite directions to each other.

5. The conveyor apparatus of claim 3, wherein first and the second portions of the chain conveyor respectively positioned on the first and the second variable conveyors are respectively varied in length with respect to the first position and the second position in opposite directions to each other.

6. The conveyor apparatus of claim 3, wherein the moving rail of the first variable conveyor moves a first distance toward a first direction away from the first and the second fixed rails of the first variable conveyor, and
the moving rail of the second variable conveyor moves the first distance toward a second direction near to the first and the second fixed rails of the second variable conveyor.

7. The conveyor apparatus of claim 6, wherein the chain conveyor includes a plurality of nodes arranged at regular intervals, and
the moving rail moves with a half speed of a speed of the chain conveyor.

8. The conveyor apparatus of claim 7, wherein the nodes positioned on the end of the first fixed rail of the first variable conveyor move a second distance that is twice the first distance, while the moving rail of the first variable conveyor moves the first distance toward the first direction, to be arranged at first distance intervals with the end of the second fixed rail of the first variable conveyor.

9. The conveyor apparatus of claim 8, wherein the nodes positioned on the end of the second fixed rail of the first variable conveyor remain in position, while the moving rail of the first variable conveyor moves by the first distance toward the first direction.

10. The conveyor apparatus of claim 7, wherein the nodes positioned on the end of the first fixed rail of the second variable conveyor remain in position, while the moving rail of the second variable conveyor moves by the first distance toward the second direction.

11. The conveyor apparatus of claim 10, wherein the nodes positioned on the end of the moving rail of the second variable conveyor, which is spaced the first distance from the end of the first fixed rail of the second variable conveyor, move the second distance, while the moving rail of the second variable conveyor moves the first distance toward the second direction, to be positioned on the end of the second fixed rail of the second variable conveyor.

12. The conveyor apparatus of claim 2, wherein a predetermined section of the chain conveyor remains in position during a first operation and moves with a speed that is twice a regular moving speed of the chain conveyor, while the moving rail of the second variable conveyor moves toward a first direction away from the first and the second fixed rails and while the moving rail of the first variable conveyor moves toward a second direction near to the first and second fixed rails during a second operation.

13. The conveyor apparatus of claim 12, wherein the predetermined section of the chain conveyor remains in position during the first operation and moves by a distance that is four times the first distance, while the moving rail of the first and the second variable conveyors moves the first distance during the second operation.

14. The conveyor apparatus of claim 2, wherein the first and the second fixed rails and the moving rail of the first and the second variable conveyors are provided with a hollow portion through which the chain conveyor passes.

15. The conveyor apparatus of claim 2, wherein the first and the second variable conveyors are arranged at a height identical to that of the rail.

16. The conveyor apparatus of claim 2, wherein the first and the second variable conveyors each further comprise a moving rail driver configured to drive the moving rail.

17. The conveyor apparatus of claim 1, wherein a time to keep the portion of the chain conveyor remaining in position is adjusted according to a moving speed of the chain conveyor.

18. The conveyor apparatus of claim 1, wherein a time to keep the portion of the chain conveyor remaining in position is adjusted according to a moving distance or a moving speed of the moving rail of the first and the second variable conveyors.

19. The conveyor apparatus of claim 1, wherein a painting room is arranged on a predetermined section of the chain conveyor remaining in position.

20. A conveyor apparatus, comprising:
a rail configured in a closed curve line;
a chain conveyor configured to move along the rail;
a driver configured to drive the chain conveyor to move along the rail; and
a first variable conveyor at a first position and a second variable conveyor at a second position each including at least one fixed rail and a moving rail, the first and the second variable conveyors configured to relatively vary lengths of a plurality of portions of the chain conveyor with respect to the first position and the second position by a movement of at least one of the moving rail of the first variable conveyor and the second variable conveyor so that a section of the chain conveyor remains in position or accelerates while other sections of the chain conveyor are moving,
wherein at least two pairs of the first and the second variable conveyors are provided.

* * * * *